US005234550A

United States Patent [19]
Ekholm et al.

[11] Patent Number: 5,234,550
[45] Date of Patent: Aug. 10, 1993

[54] WALL MEANS HAVING SLOTS BETWEEN ADJACENT BARS FOR WITHDRAWING LIQUID FROM PARTICLE MATERIAL

[75] Inventors: Rolf Ekholm; Ulf Jansson, both of Karlstad, Sweden

[73] Assignee: Kamyr Aktiebolag, Karlstad, Sweden

[21] Appl. No.: 728,148

[22] Filed: Jul. 10, 1991

[30] Foreign Application Priority Data

Jul. 20, 1990 [SE] Sweden ............................. 9002473

[51] Int. Cl.$^5$ ..................... B01D 29/00; D21D 5/16
[52] U.S. Cl. ................................. 162/251; 210/162; 210/498
[58] Field of Search .............. 162/251; 210/498, 477, 210/162, 499

[56] References Cited

U.S. PATENT DOCUMENTS

| | | | |
|---|---|---|---|
| 2,998,064 | 8/1961 | Lang | 162/251 |
| 3,385,753 | 5/1988 | Rich | 162/251 |
| 4,529,520 | 7/1985 | Lampenius | 210/498 |
| 5,047,148 | 9/1991 | Arai | 210/499 |

Primary Examiner—Steve Alvo
Attorney, Agent, or Firm—Cushman, Darby & Cushman

[57] ABSTRACT

A wall means intended for apparatus for separation of a liquid-containing portion from a liquid-containing particle material which is fed through the apparatus in a predetermined direction (A). The wall means comprises a plurality of bar profiles defining continuous slots between them to allow through the liquid-containing portion. According to the invention each bar profile has on its inner side facing the liquid-containing particle material a ridge portion extending between the ends of the bar profile and being provided with two continuous guide surfaces which, as seen in a cross section of the rod profile, are inclined in relation to the drainage direction (B) of the liquid-containing portion through the adjacent slot. Furthermore, the inclined guide surfaces in their longitudinal direction are disposed to coincide with the predetermined direction of feed (A) of the liquid-containing particle material in order to influence the liquid-containing particle material to maintain this direction of feed (A).

7 Claims, 2 Drawing Sheets

WALL MEANS HAVING SLOTS BETWEEN ADJACENT BARS FOR WITHDRAWING LIQUID FROM PARTICLE MATERIAL

FIELD AND BACKGROUND OF THE INVENTION

The present invention relates to a wall means intended for apparatus or equipment for continuous separation of a liquid-containing portion from a liquid-containing particle material which is fed continuously through the apparatus in a predetermined direction of feed (A) past the wall means.

Draining liquid through a liquid-containing particle material forming a porous particle bed, e.g. pulp suspensions and wood chips suspended in digester liquor, always results in a consistency gradient occurring in the draining direction of the liquid towards the throttling wall means of a thickener, for instance, for the particle phase such as the fiber or wood chip phase. This consistency gradient increases with increasing drainage velocity and also with increasing time during which drainage occurs without the drainage direction being changed.

Wall means of the type described above in the form of screening elements are known through U.S. Pat. No. 2,998,064 and U.S. Pat. No. 3,385,753 for instance. The inner sides of the bar profiles in the known screening elements have flat surfaces which are directed perpendicular to the central plane of the slots and to the drainage direction of the liquid. However, material collects close to said surfaces, with a relatively high concentration in relation to the surrounding material through which liquid drains in the direction to and through the slots. The high-consistency sections create increased resistance to the surrounding liquid-containing particle material so that its rate of feed is gradually decreased, and the risk of particles becoming caught in the slots is increased, thereby impairing the draining capacity of the screening element. A plug of particle material formed in this or some other way also prevents the liquid-containing particle material from moving linearly forwards. Instead it will be diverted laterally past the plug. Such non-linear movements of the liquid-containing particle material around the plug will also disturb the feeding of the liquid-containing particle material forward in other places in the chamber, particularly upstream of the plug. The result will be uncontrolled feeding of the liquid-containing particle material and a resulting uneven drainage of liquid so that varying consistency gradients will arise at various points within cross sections taken at the level of the plug and upstream or downstream thereof.

The problems mentioned are even more pronounced in screening elements having perforations or short slots.

SUMMARY OF THE INVENTION

The object of the present invention is to essentially reduce the above-mentioned problems and to provide an improved wall means ensuring a well defined, constant direction of feed of the liquid-containing particle material.

The present invention relates to a wall means intended for apparatus for continuous separation of a liquid-containing portion from a liquid-containing particle material which is fed continuously through the apparatus in a predetermined direction of feed (A) past the wall means, said wall means comprising a plurality of bar profiles defining continuous slots between them to allow through said liquid-containing portion, each bar profile being formed on its inner side facing the liquid-containing particle material with a ridge portion extending between the ends of the bar profile, said ridge portion being provided with at least one continuous guide surface which, as seen in a cross section of the rod profile, is inclined in relation to the drainage direction (B) of the liquid-containing portion through the adjacent slot, said inclined guide surfaces in their longitudinal direction being disposed to coincide with the predetermined direction of feed (A) of the liquid-containing particle material in order to influence the liquid-containing particle material to maintain this direction of feed (A). The expression "particle material" may include any type of cellulosic fibrous material.

BRIEF DESCRIPTION OF THE DRAWINGS

The invention will be described in more detail in the following, with reference to the accompanying drawings.

DETAILED DESCRIPTION OF THE INVENTION

Figure 1:
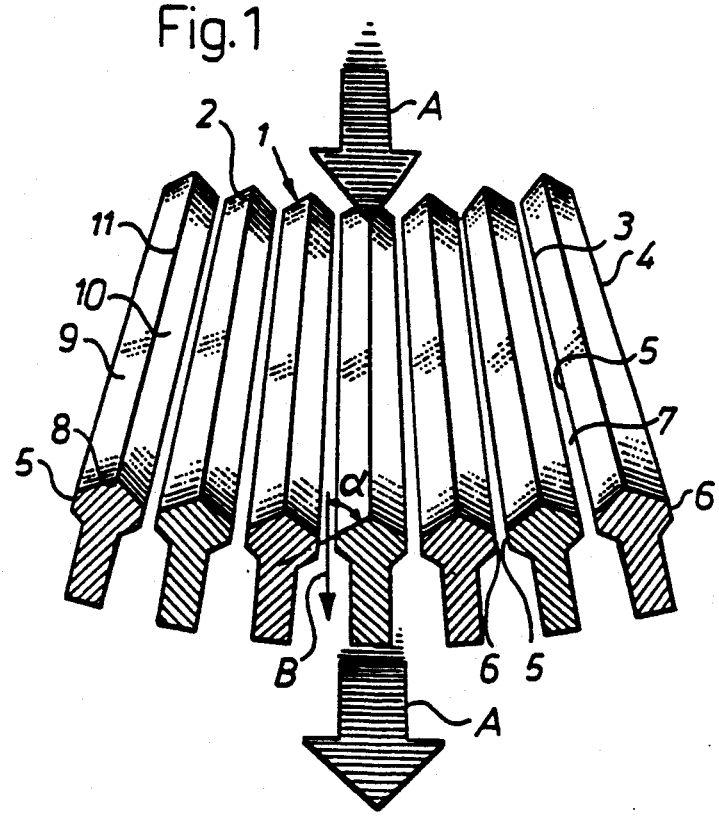
FIG. 1 is a view in perspective of a portion of a wall means according to a first embodiment of the invention.

FIG. 1 shows schematically a portion of a wall means provided with drainage openings according to a first embodiment of the invention. The wall means may be disposed in apparatus or equipment (not shown) for such apparatus comprising a chamber through which a liquid-containing particle material is continuously fed from an inlet to an outlet thereof, a liquid-containing portion being separated from the liquid-containing particle material via said wall means. The liquid-containing portion separated may in addition to liquid contain smaller or larger quantities of solid material, depending on the type of separation to be performed and the type of apparatus or equipment to be used.

The wall means, generally termed a screening means, comprises a plurality of elongate bars each having the indicated shape or profiles 1. In the embodiment shown in FIG. 1, said bar profiles are identical in shape. Each bar profile has an inner side 2 facing towards said chamber in the apparatus through which the liquid-containing particle material is continuously fed in the direction indicated by the arrows A. The inner side 2 is defined laterally by two longitudinal side edges 3, 4 which also define two longitudinal side surfaces 5, 6. The bar profiles 1 are spaced a predetermined distance from each other so that the side surfaces 5, 6 of two adjacent bar profiles facing each other define a drainage opening in the form of a continuous slot 7 to allow through said liquid-containing portion in the seperation or drainage direction indicated by the arrow B. The smallest width of the slot 7, as seen in an optional cross section and in respect to the drainage direction B, is between the two side edges 3, 4 of two adjacent bar profiles facing each other. The side surfaces 5, 6 facing each other may be parallel with each other or diverging. The bar profiles 1 can be fixed in any suitable manner in relation to each other, depending on the shape and size of the wall means.

The slots 7 are identical as to shape and size. In the embodiment shown in FIG. 1 the slots 7 diverge in the direction of feed A of the liquid-containing particle material. Instead of increasing, the width of the slot may be constant in the direction of feed A. However, the embodiment shown in FIG. 1 is preferred for most applications of the invention. With increasing slot width and constant width of the bar profiles, the wall means acquires a larger dimension at the downstream end than at the upstream end and the chamber for the liquid-containing particle material will therefore expand in a beneficial manner in the direction of feed A. This difference in dimension can also be achieved by shaping the bar profiles so that their width, i.e. the distance between the side edges 3, 4 of one and the same bar profile, increases in the direction of feed A in which case the width of the slots 7 may be constant or may increase in the direction of feed A.

Each bar profile 1 is provided on its inner side 2 with a continuous, longitudinal ridge portion 8. In the embodiment shown in FIG. 1 the ridge portion 8 forms two continuous guide surfaces 9, 10 which as seen in a cross section through the bar profile, are inclined from each other, in the direction from the common cam edge 11 towards respective side edges 3, 4.

The bar profiles 1 are so aligned in the apparatus that their guide surfaces 9, 10 extend in the same direction as the intended direction of feed A of the liquid-containing particle material. Since the bar profile is symmetrical about its longitudinal central plane, the bar profile itself will also have the same alignment as said direction of feed A.

Figure 2:
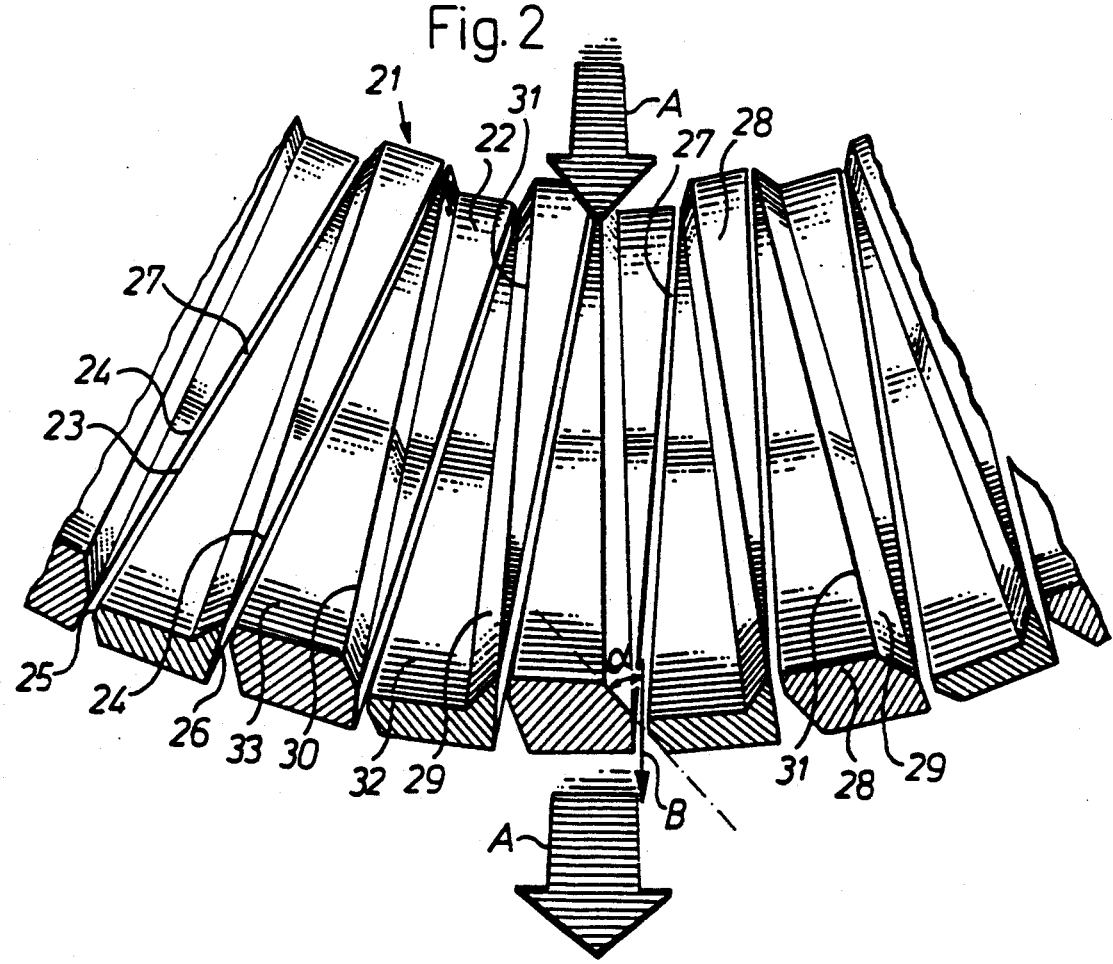
FIG. 2 is a view in perspective of a similar portion of a wall means according to a second embodiment of the invention.
Figure 3:
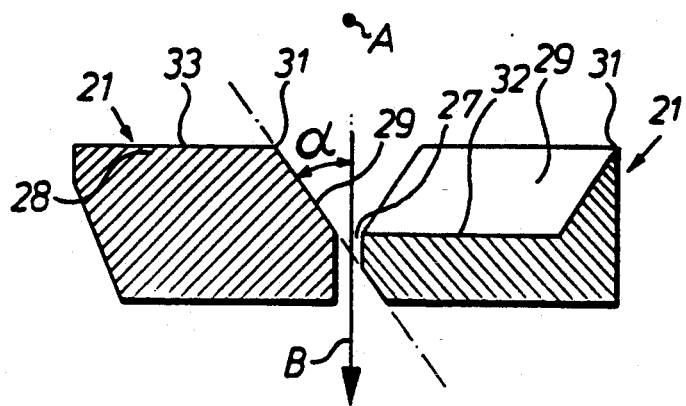
FIG. 3 is a cross sectional view of two adjacent bar profiles of the wall means according to FIG. 2.

FIG. 2 shows schematically a portion of a wall means provided with drainage openings according to a second embodiment of the invention. This may be disposed in the same way as that according to FIG. 1 and comprises a plurality of elongate bar profiles 21. Each bar profile 21 has an inner side 22 facing towards the liquid-containing particle material, the material being fed in the direction indicated by the arrows A. The inner side 22 is defined laterally by two longitudinal side edges 23, 24 which also define two longitudinal side surfaces 25, 26. The bar profiles 21 are spaced a predetermined distance from each other so that the side surfaces 25, 26 of two adjacent bar profiles facing each other define a drainage opening in the form of a continuous slot 27 to allow through said liquid-containing portion in the separation or drainage direction indicated by the arrow B in FIGS. 2 and 3. The smallest width of the slot 27, as seen in an optional cross section and in respect to the drainage direction B, is between the two side edges 23, 24 of two adjacent bar profiles facing each other. The side surfaces 25, 26 facing each other may be parallel with each other or diverging. The bar profiles 21 can be fixed in any suitable manner in relation to each other, depending on the shape and size of the wall means.

The slots 27 are identical as to shape and size. In the embodiment shown in FIG. 2 the slots 27 diverge in the direction of feed A of the liquid-containing particle material. Instead of increasing, the width of the slot may be constant in the direction of feed A. However, the embodiment shown is preferred for most applications of the invention. With increasing slot width and constant width of the bar profiles, the wall means acquires a larger dimension at the downstream end than at the upstream end and the chamber for the liquid-containing particle material will therefore expand in a beneficial manner in the direction of feed A. In this embodiment also, this difference in dimension can also be achieved by shaping the bar profiles so that their width, i.e. the distance between the side edges 23, 24 of one and the same bar profile, increases in the direction of feed A in which case the width of the slots 27 may be constant or may increase in the direction of feed A.

Each bar profile 21 is provided on its inner side 22 with a continuous, longitudinal ridge portion 28. In the embodiment shown in FIGS. 2 and 3 the ridge portion 28 forms a continuous guide surface 29 which, as seen in a cross section through the bar profile, is inclined in the direction from a cam edge 31, towards a surface 32 forming a depression of the inner side 22, said depressed surface 32 being located nearest the side edge 23 or 24, respectively, whereby the cam edge 31 and the other side edge 24 or 23, respectively, of one and the same bar profile 21 between them define a raised surface 33. Both the depressed surface 32 and the raised surface 33 are triangular in shape since the ridge portion 28 has been made wedge-shaped. The inclined guide surface 29 extends diagonally between the ends of the bar profile. The bar profiles are disposed alternatively in different directions so that the depressed surfaces 32 of two adjacent bar profiles 21 will be located next to each other and the raised surfaces 33 of two other adjacent bar profiles 21 will be located next to each other so that in each case a slot 27 separates the depressed surfaces 32 and the raised surfaces 33, respectively, from each other.

The bar profiles 21 are so aligned in the apparatus that their guide surfaces 29 extend in the same direction as the intended direction of feed A of the liquid-containing particle material. Since the bar profiles are not symmetrical about their longitudinal central plane, the bar profiles themselves will have an inclined alignment, and consequently also the slots 27, in relation to the direction of feed A. The inclination is such that the slots 27 form an acute angle to the direction of feed A, and it will be understood that this angle corresponds to the acute angle of the depressed and raised surfaces 32 and 33 (since the inclined guide surface coincide with the direction of feed A).

In the embodiments shown and described above the laterally inclined guide surfaces 9, 10; 29 will prevent the liquid-containing particle material from moving sideways from one bar profile 1; 21 to the next. Instead, the guide surfaces 9, 10; 29 will influence the liquid-containing particle material so that it retains the desired direction of feed A. During continuous operation, therefore the guide surfaces will ensure that the liquid-containing particle material is given a linear movement at all points in the chamber through which the liquid-containing particle material is fed. Such a cotrolled direction of flow A reduces the risk of particle material becoming jammed in the slots 7; 27 and, should this anyway occur, the plug formed will grow considerably more slowly than is the case with the conventional bar profile with flat inner sides (perpendicular to the drainage direction) mentioned in the introduction. Furthermore, during the course of drainage, liquid will be forced to pass along the guide surfaces, thus forming a layer of liquid thereon which reduces the friction between the liquid-containing material and the bar profiles. This effect compensates for the increasing internal surface of the wall means due to the alignment of the guide surfaces. The best friction-reducing effect is obtained with guide surfaces having such an inclination that they form an angle $\alpha$ of about 70°–85°, preferably about 75°-80°, with the drainage direction B. The effect is particularly pronounced when continuously draining liquor-containing chip material and using a bar profile according to FIG. 1 with double guide surfaces which thus form an angle of 140°-170°, preferably 150°-160°, to each other.

The influence of the guide surfaces on the flow of material, giving it a specific direction, can be achieved with any angle α between 40 and 85°.

As mentioned, in the embodiment shown in FIG. 2 the slots 27 are inclined in relation to the direction of feed A. This means that the drainage direction B of the liquid before it reaches the slots 27 will change continuously as the liquid-containing particle material is moved in the direction of feed A which is determined by the guide surfaces 29. Such a continuous changing of the inner drainage direction, while at the same time the direction of feed of the liquid-containing particle material remains constant, permits a higher drainage rate and thus higher capacity of the wall means without the slots becoming clogged by particle material.

A diverging cross-sectional profile of the wall means itself, so that the chamber through which the liquid-containing particle material moves is expanded in the direction of feed, offers a continuously decreasing contact pressure against the wall means. This contributes further to facilitating the movement of the liquid-containing particle material along the guide surfaces 9, 10; 29. The decreasing contact pressure also helps to continuously break or dissolve the high-consistency border layer of particle material which may be formed nearest the slots between the bar profiles. This in turn contributes to reducing the total pressure drop over the bed of particle material and it will thus be possible to further increase drainage capacity of the wall means to high levels.

The wall means may be shaped in any suitable manner. It may be a cylinder, truncated cone, or a disc with concave or convex inner side. The wall means may be mounted or constructed in apparatus or equipment for such apparatus such as a vessel for thickening a suspension of chips or pulp or for displacing one liquid from a suspension of chips or pulp by means of another liquid. Said vessel may be a digester or a bleaching tower the strainer sections of which being provided with equipment containing one or more wall means according to the invention. Further examples of apparatus which may be provided with wall means according to the invention are thickeners and diffusers in which the wall means may be movably disposed.

That which is claimed is:

1. A wall means intended for apparatus for continuous separation of a liquid-containing portion from a liquid-containing particle material which is fed continuously through the apparatus in a predetermined direction of feed (A) past the wall means in a drainage direction (B), said wall means comprising a plurality of bars having opposite side edges with each side edge defining a slot between adjacent bars to allow passage of said liquid-containing portion, each bar having opposite ends and an inner side, facing the liquid-containing particles material, said inner side being formed with a ridge portion extending between said ends of each bar, said ridge portion being provided with two continuous guide surfaces each of which, as viewed in a cross section of the bar, is inclined in relation to the drainage direction (B) of the liquid-containing portion through an adjacent slot, said inclined guide surfaces having a longitudinal direction and, in said longitudinal direction, said inclined guide surfaces being disposed to influence said direction of feed (A) of the liquid-containing particle material in order to influence the liquid-containing particle material to maintain said direction of feed, said two continuous guide surfaces being inclined from each other in a direction toward respective side edges defining a said slot, said guide surfaces of a said bar starting from a common cam edge of said ridge portion, said cam edge being the farthest extending portion of the ridge portion from the ends of each bar.

2. A wall means as recited in claim 1 wherein said bar profiles, slots and guide surfaces are disposed in the direction of feed (A) of the liquid-containing particle material.

3. A wall means as recited in claim 1 wherein said guide surfaces, as seen in the cross section of the bar profile, form an angle α with the drainage direction (B) of the liquid-containing portion through the slot of about 70°-85°.

4. The wall means as claimed in claim 3, wherein the angle α is in the range 75°-80°.

5. A wall means intended for apparatus for continuous separation of a liquid-containing portion from a liquid-containing particle material which is fed continuously through the apparatus in a predetermined direction of feed (A) past the wall means in a drainage direction (B), said wall means comprising a plurality of bars having opposite side edges with each side edge defining a slot between adjacent bars to allow passage of said liquid-containing portion, each bar having opposite ends and an inner side, facing the liquid-containing particles material, said inner side being formed with a ridge portion extending between said ends of each bar, said ridge portion being provided with two continuous guide surfaces each of which, as viewed in a cross section of the bar, is inclined in relation to the drainage direction (B) of the liquid-containing portion through an adjacent slot, said inclined guide surfaces having a longitudinal direction and, in said longitudinal direction, said inclined guide surfaces being disposed to influence said direction of feed (A) of the liquid-containing particle material in order to influence the liquid-containing particle material to maintain said direction of feed, said two continuous guide surfaces being inclined from each other in a direction toward respective side edges defining a said slot, said ridge portion being provided with a continuous guide surface which is inclined in a direction to a surface to form a depression on the inner side, said depression extending to one of the side edges defining the slot, said guide surface extending laterally from a cam edge which between itself and the other slot-defining side edge defines a raised surface parallel to said depression and is triangular in shape with an acute angle with said ridge portion being wedge-shaped, said cam edge being the farthest extending portion of said ridge from the ends of each bar.

6. A wall means as recited in claim 5 wherein said guide surface extends diagonally across the bar profile from one end to the other, the guide surfaces of two adjacent bar profiles facing each other, and said slots being inclined in relation to the direction of feed (A) of the liquid-containing particle material.

7. A wall means as recited in claim 6 wherein said slots are inclined in relation to the direction of feed of the liquid-containing particle material with an acute angle corresponding to the acute angle of the triangular depressed and raised surfaces.

* * * * *